Figure 1:
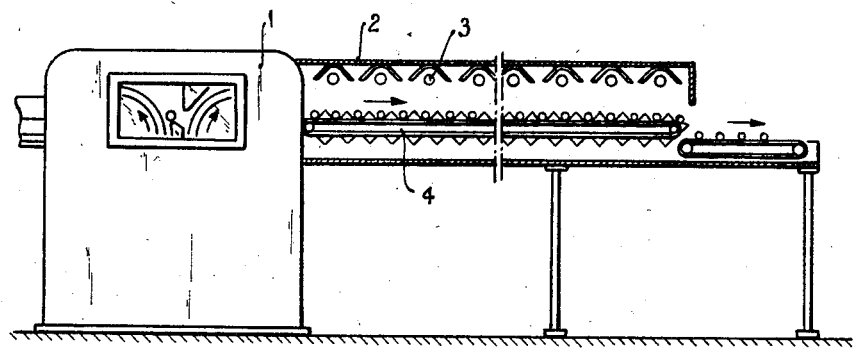

April 9, 1957　　　W. DE WAAL　　　2,788,113
CONVEYING BELT FOR CIGARS
Filed Oct. 1, 1954

United States Patent Office 2,788,113
Patented Apr. 9, 1957

2,788,113

CONVEYING BELT FOR CIGARS

Walter de Waal, Eindhoven, Netherlands, assignor to N. V. Vereenigde Tabaksindustrieën Mignot & De Block Application October 1, 1954, Serial No. 459,816

Claims priority, application Netherlands April 22, 1954

2 Claims. (Cl. 198—33)

The invention relates to a conveying belt for cigars comprising endless chains and cross-members mounted on said chains for taking the cigars along with the chains, said cross-members extending transversely to the direction of movement thereof and bounding between one another cigar storage places, each of which has a capacity for one cigar only.

During the treatment, e. g. the drying, of cigars it is often required that the cigars on their way are turned about their axis, say a quarter of or half a revolution, so that their surfaces are evenly affected. This turning operation is mostly carried out when the cigars are carried from one conveying belt to the next one.

It is an object of the invention to provide a device by means of which the turning of the cigars lying on the conveying belt is considerably simplified. The invention consists in that one or more stationary guiding members are positioned in the active path of the cross-members and that the guiding faces of said guiding members protrude from below into each passing storage place, thereby lift the cigar contained in said place a little and permit it to roll across said face.

It will be obvious that the angle of rotation of the cigars depends on the length of the guiding faces and on the diameter of the cigars. These guiding faces may be very short, so that the cigars are turned thereby through a small angle only. In that case generally a number of guiding members will be positioned in successive rows in the path of the cigars, so that the latter will be regularly rotated about their axes. The guiding members may also extend through long distances so that the cigars keep rolling during their transport.

The guiding members may be formed as strips, which extend in the direction of movement of the cross-members and are so adjustably mounted as to permit the active length of their guiding faces to be varied. For this purpose said guiding strips may be rotatably mounted about shafts extending transversely to the direction of movement of the cross-members.

It is advantageous to construct the cross-members in such a manner that they have a triangular cross-section, point with their top-edges from the chains and nearly touch or contact with their base-edges corresponding edges of the adjacent cross-members and that their base-edges have recesses, which are penetrated by the guiding faces of the guiding members, when the cross-members pass the latter.

It is to be noted that instead of chains, bands, cables or the like may be used for supporting and driving the cross-members.

Figure 2:
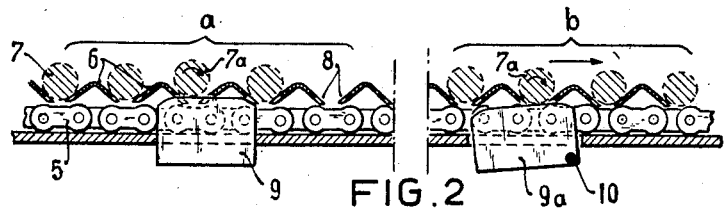
Figure 3:
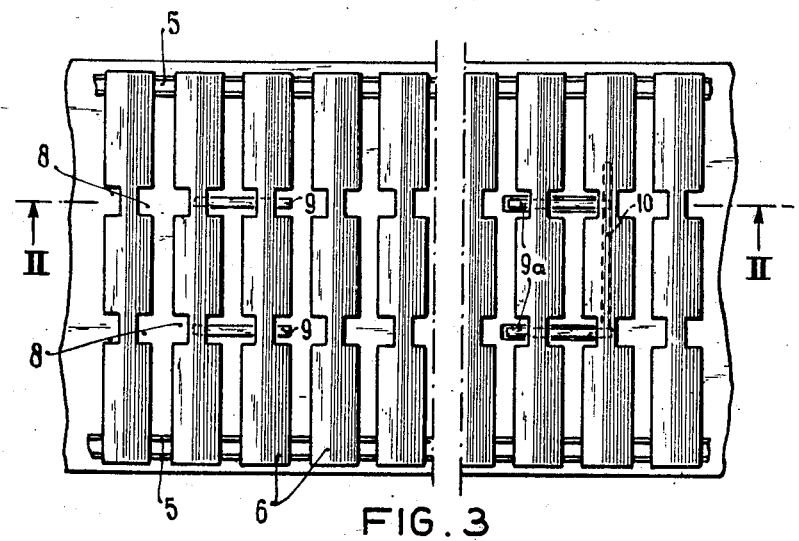

For the elucidation of the invention reference is made to the accompanying drawing, in which:

Fig. 1 is partially an elevational view, partially a vertical sectional view of a cigar matting machine, provided with a conveying belt according to the invention, Fig. 2 on a larger scale a vertical sectional view of parts of said conveying belt, and Fig. 3 a plan view of the conveying belt shown in Fig. 2.

In the drawing 1 is a machine for the wet matting of cigars and 2 is a drying tunnel, through which the matted cigars are moved. In the drying tunnel heating devices 3, e. g. lamps, and a conveying belt 4, upon which the cigars come to lie at equal distances from one another, are provided.

Figs. 2 and 3 show that the conveying belt consists of two endless chains 5 interconnected by cross-members 6 for taking the cigars along with the chains, said cross-members being secured with their ends to the chains in a manner not shown. These cross-members have a triangular cross-section and bound between each other storage places for the cigars 7, said storage places having each a triangular cross-section too. The cross-members 6 have recesses 8 at their base-edges. These recesses are aligned in rows or series extending in the direction of movement of the cross-members. There, where these series of recesses are situated, guiding members 9 in the form of strips or plates are positioned in the active path of the cross-members, said guiding members passing through said recesses 8 and penetrating with their guiding faces the storage spaces between the cross-members 6 for the cigars. When a storage space of the conveying belt and containing a cigar passes a set of guiding members 9, the cigar 7a is lifted a little and comes to roll on the upper surfaces or guiding faces of said guiding members. The result thereof is that the cigar is rotated through an angle which depends on the length of said upper surfaces. In the present case the cigars are turned through an angle of 180° about their longitudinal axis.

In Fig. 2a the guiding members 9 are fixed, but in Fig. 2b the guiding members 9a are angularly adjustable about a shaft 10. The length of the guiding faces passing from below into the storage spaces for the cigars can be varied by varying the angular position of the guiding members. In Fig. 2b about one half of each guiding face is active and the shown cigars are rotated thereby about a quarter of a revolution.

Instead of a plurality of short guiding members guiding strips may be used which extend throughout the entire length of the conveying belt, so that the cigars keep rolling during the whole time of their transport by said belt.

What I claim is:

1. A conveying belt for cigars comprising, in combination, endless chains, transverse members mounted on said chains for conveying the cigars while the cigars extend transversely with respect to the direction of movement of said chains, said transverse members defining a plurality of transversely extending cigar-receiving areas each being of a capacity to receive a single cigar, said areas being open at their bottoms, at least one stationary lifting and guiding member formed from a strip extending in the direction of said chain and having an edge receivable in the bottom of said areas for at least partial engagement with the cigars contained therein to effect frictional rotational displacement of said cigars through a predetermined angle as the conveying belt moves, each guiding member being adjustably mounted to permit the length of the portion of said edge engageable with each cigar to be varied.

2. A conveying belt for cigars comprising, in combination, endless chains, transverse members mounted on said chains for conveying the cigars while the cigars extend transversely with respect to the direction of movement of said chains, said transverse members having a triangular cross-section defining a plurality of transversely-extending cigar-receiving areas of triangular cross-section each being of a capacity to receive a single cigar, said areas being open at their bottoms, at least one stationary lifting and guiding member formed from a strip extending in the direction of said chain and having an edge receivable in the bottom of said areas for it least partial engagement with the cigars contained therein to effect frictional rotational displacement of said cigars through a predetermined angle as the conveying belt moves, each guiding member being pivotally mounted adjacent one end to permit the length of the portion of said edge engageable with each cigar to be varied, and said transverse members being partly cut away to accommodate the lifting and guiding.

References Cited in the file of this patent
UNITED STATES PATENTS

| | | |
|---|---|---|
| 2,069,872 | Burns | Feb. 9, 1937 |
| 2,639,830 | Weimont | May 26, 1953 |